(12) United States Patent
Wang et al.

(10) Patent No.: US 12,393,231 B2
(45) Date of Patent: Aug. 19, 2025

(54) FLEXIBLE DISPLAY APPARATUS AND SUPPORT ASSEMBLY

(71) Applicant: BOE Technology Group Co., Ltd., Beijing (CN)

(72) Inventors: Haoran Wang, Beijing (CN); Lu Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 7 days.

(21) Appl. No.: 18/032,210

(22) PCT Filed: May 26, 2021

(86) PCT No.: PCT/CN2021/096050
§ 371 (c)(1),
(2) Date: Apr. 17, 2023

(87) PCT Pub. No.: WO2022/246688
PCT Pub. Date: Dec. 1, 2022

(65) Prior Publication Data
US 2023/0393623 A1    Dec. 7, 2023

(51) Int. Cl.
*G06F 1/16*    (2006.01)

(52) U.S. Cl.
CPC .......... *G06F 1/1652* (2013.01); *G06F 1/1618* (2013.01)

(58) Field of Classification Search
CPC .... G06F 1/1652; G06F 1/1618; G06F 1/1624; G09F 9/301; H04M 1/0235; H04M 1/0268
See application file for complete search history.

(56) References Cited

U.S. PATENT DOCUMENTS 10,367,173 B1    7/2019   Wu et al.
10,403,177 B2    9/2019   Lim
(Continued)

FOREIGN PATENT DOCUMENTS

CN    104461127 A    3/2015
CN    108133666 A    6/2018
(Continued)

OTHER PUBLICATIONS

Office Action received for Chinese Patent Application No. 202180001268.5, mailed on Nov. 21, 2024, 27 pages (14 pages of English Translation and 13 pages of Original Document).
(Continued)

*Primary Examiner* — Rockshana D Chowdhury
(74) *Attorney, Agent, or Firm* — ArentFox Schiff LLP; Michael Fainberg

(57) ABSTRACT

Disclosed are a flexible display apparatus and a support assembly. The flexible display apparatus includes: a roller shaft; and a flexible module including a rolling and sliding region and a flat region. The rolling and sliding region moves around the roller shaft. The flexible module includes a flexible display screen and the support assembly. The support assembly is disposed on the side of the surface of the flexible display screen facing the roller shaft, and includes a first support member and a second support member. The second support member is disposed on the side of the first support member facing away from the flexible display screen, and includes a plurality of support bars. The plurality of support bars are arranged along the moving direction of the flexible module, and each support bar is consistent with the extending direction of the roller shaft and is fixed on the first support member.

20 Claims, 13 Drawing Sheets

(56) References Cited

U.S. PATENT DOCUMENTS

| | | | |
|---|---|---|---|
| 10,747,269 B1* | 8/2020 | Choi | G06F 1/1652 |
| 10,904,371 B1 | 1/2021 | Song et al. | |
| 10,963,014 B1* | 3/2021 | Park | G06F 1/1652 |
| 11,012,546 B1* | 5/2021 | Song | G06F 1/1656 |
| 11,315,443 B2* | 4/2022 | Han | G06F 1/1624 |
| 11,675,392 B2* | 6/2023 | Park | G06F 1/1698 |
| | | | 361/679.01 |
| 11,693,452 B2* | 7/2023 | Kwak | H04M 1/0268 |
| | | | 361/679.01 |
| 11,775,016 B2* | 10/2023 | Choi | G06F 1/1624 |
| | | | 361/679.01 |
| 11,848,563 B2* | 12/2023 | Kim | H01Q 1/38 |
| 11,860,694 B2* | 1/2024 | Shin | G06F 1/1637 |
| 11,974,406 B2* | 4/2024 | Lee | G06F 1/1637 |
| 12,010,253 B2* | 6/2024 | Lee | G06F 1/1652 |
| 12,032,403 B2* | 7/2024 | Kim | G06F 1/1652 |
| 12,113,921 B2* | 10/2024 | Peltoluhta | G06F 1/1652 |
| 12,143,524 B2* | 11/2024 | Kim | H04M 1/0262 |
| 12,158,775 B2* | 12/2024 | Ahn | G09F 9/30 |
| 12,167,552 B2* | 12/2024 | Feng | G06F 1/1652 |
| 2017/0329369 A1 | 11/2017 | Takayanagi et al. | |
| 2020/0196459 A1 | 6/2020 | Huang | |
| 2020/0267246 A1 | 8/2020 | Song et al. | |
| 2020/0363841 A1 | 11/2020 | Kim et al. | |
| 2021/0044683 A1 | 2/2021 | He et al. | |
| 2022/0166082 A1 | 5/2022 | Wang et al. | |
| 2022/0240400 A1 | 7/2022 | Zhou | |
| 2022/0255023 A1 | 8/2022 | Cai et al. | |
| 2022/0386485 A1 | 12/2022 | Dong et al. | |
| 2023/0199980 A1 | 6/2023 | Jiang | |

FOREIGN PATENT DOCUMENTS

| | | |
|---|---|---|
| CN | 108259649 A | 7/2018 |
| CN | 208595386 U | 3/2019 |
| CN | 110047384 A | 7/2019 |
| CN | 110599912 A | 12/2019 |
| CN | 111047995 A | 4/2020 |
| CN | 111161636 A | 5/2020 |
| CN | 111326069 A | 6/2020 |
| CN | 111565239 A | 8/2020 |
| CN | 111613144 A | 9/2020 |
| CN | 111833743 A | 10/2020 |
| CN | 111862822 A | 10/2020 |
| CN | 111862824 A | 10/2020 |
| CN | 112150921 A | 12/2020 |
| CN | 212411481 U | 1/2021 |
| CN | 112652246 A | 4/2021 |
| CN | 112967602 A | 6/2021 |
| CN | 113725514 A | 11/2021 |
| JP | 2016-085454 A | 5/2016 |
| JP | 2020-076986 A | 5/2020 |
| WO | 2010/004703 A1 | 1/2010 |

OTHER PUBLICATIONS

Office Action received for Japanese Patent Application No. 2023-526158, mailed on Feb. 25, 2025, 24 pages (12 pages of English Translation and 12 pages of Original Document).

* cited by examiner

FLEXIBLE DISPLAY APPARATUS AND SUPPORT ASSEMBLY

CROSS REFERENCE TO RELATED APPLICATIONS

The present disclosure is a US National Stage of International Application No. PCT/CN2021/096050, filed on May 26, 2021, the entire contents of which are incorporated herein by reference.

FIELD

The present application relates to the field of display technology, and in particular to a flexible display apparatus and a support assembly.

BACKGROUND

The curling display, as a new flexible display application form, has attracted extensive attention. The curling action can be achieved by means of a continuously applied tension and a rotatable shaft. The display screen that can be used for a curling display generally require a support structure to assist in the curling and unfolding actions, and the design of the support structure has a great impact on the curling implementation and reliability of the curling display.

SUMMARY

The present application discloses a flexible display apparatus and a support assembly, to improve the structure of the curling display and increase the reliability of the curling and unfolding actions of the curling display.

In a first aspect, an embodiment of the present application provides a flexible display apparatus, including:
  a roller shaft; and
  a flexible module including a rolling and sliding area and a plane area, where the rolling and sliding area is configured to move around the roller shaft to realize unfolding and folding of the flexible module; the flexible module includes a flexible display screen and a support assembly; the support assembly is arranged on a surface of the flexible display screen facing the roller shaft, and includes a first support member and a second support member; the first support member is a bendable plate-like structure, and the second support member is arranged on a side of the first support member away from the flexible display screen and includes a plurality of support bars arranged in a moving direction of the flexible module, and each support bar has a same extending direction as the roller shaft and is fixed on the first support member.

Optionally, the flexible display apparatus further includes a tension applying component;
  where the support assembly includes a first end and a second end oppositely arranged; the support assembly bypasses the roller shaft along a direction from the first end to the second end, and the first end is connected to the tension applying component.

Optionally, the tension applying component includes a traction part, a steering shaft component and a fixing part;
  the traction part includes a third end and a fourth end, the third end is connected to the first support member, and the fourth end bypasses the steering shaft component and is connected to the fixing part; and the roller shaft moves relative to the fixing part, to drive the flexible module to move and unfold around the roller shaft.

Optionally, the steering shaft component includes a moving shaft and a fixed shaft; and the traction part bypasses the fixed shaft and the moving shaft so that an extending direction reversed twice; and
  a position of a shaft center of the fixed shaft is fixed relative to the fixing part, and a position of a shaft center of the moving shaft is fixed relative to a shaft center of the roller shaft.

Optionally, the flexible display apparatus further includes a first adhesive layer between the traction part and the first support member, where the traction part and the first support member are bonded by the first adhesive layer.

Optionally, an edge of the first support member close to the first end exceeds an edge of the flexible display screen close to the first end, and the traction part is connected to a part of the first support member beyond the flexible display screen.

Optionally, the traction part is bonded to a surface of the first support member facing the flexible display screen.

Optionally, the traction part includes a double-layer structure, and the double-layer structure is respectively bonded to two surfaces of the first support member.

Optionally, an edge of the first support member close to the first end is substantially aligned with an edge of the flexible display screen close to the first end, and the traction part is bonded to a surface of the first support member away from the flexible display screen.

Optionally, the first support member is provided with a first opening in a thickness direction of the first support member, the traction part is provided with a second opening, the first support member is connected to the traction part through connectors inserted into the first opening and the second opening, and the connectors are made of polymer material.

Optionally, the first opening is a half-through hole not penetrating the first support member or a through hole penetrating the first support member; and the second opening is a through hole penetrating the traction part.

Optionally, the flexible display apparatus further includes a casing in which the roller shaft and the tension applying component are arranged;
  where the first end of the support assembly is in the casing, and the second end of the support assembly bypasses the roller shaft and protrudes out of the casing.

Optionally, the first support member is provided with a hollow opening in the rolling and sliding area.

Optionally, the first support member is provided with hollow openings in both the rolling and sliding area and the plane area.

Optionally, the hollow opening includes at least two rows of through holes, each row of through holes is arranged in an extending direction of the roller shaft, the through holes in odd-numbered rows and the through holes in even-numbered rows are at least partly staggered; and the through holes are strip-shaped holes extending in the extending direction of the roller shaft.

Optionally, the second support member is in the rolling and sliding area.

Optionally, the support assembly further includes a reinforcement structure arranged on a side of the first support member away from the flexible display screen and arranged in the plane area.

Optionally, the reinforcement structure is made of a same material as the first support member or the second support member.

Optionally, a thickness of the reinforcement structure is substantially same as a thickness of the second support member in a direction perpendicular to the first support member.

Optionally, the flexible display apparatus further includes a second adhesive layer between the second support member and the first support member, where the second support member and the first support member are bonded through the second adhesive layer; and the second adhesive layer includes a base material layer and adhesive layers on both sides of the base material layer, and the base material layer is made of polymer material.

Optionally, the first support member includes metal or alloy material, and a thickness of the first support member is 0.02 mm-0.5 mm.

Optionally, the second support member includes metal, alloy or metal oxide material, a width of each of the support bars in the second support member is 0.1 mm-1 mm, and a thickness of each of the support bars in a direction perpendicular to the first support member is 0.1 mm-1 mm.

Optionally, at least some of the plurality of support bars are provided with limiting parts, and positions between the at least some of the plurality of support bars and adjacent support bars thereof are limited relative to the limiting parts.

Optionally, the limiting part includes at least one of a protrusion structure and a groove structure; the protrusion structure includes an arc protrusion, a square protrusion, a trapezoidal protrusion and a concave protrusion; and the groove structure includes an arc groove, a square groove and a trapezoidal groove.

Optionally, the plurality of support bars include a first support bar located at one end; among the plurality of support bars, one sides of remaining support bars other than the first support bar facing the first support bar each are provided with the limiting part, and the limiting part is the protrusion structure.

Optionally, the plurality of support bars include two end support bars at two ends and middle support bars between the two end support bars; two sides of each middle support bar facing the two end support bars are provided with the limiting part, one side of each end support bar facing the middle support bars is provided with the limiting part, and the limiting part is the protrusion structure.

Optionally, a first side of each support bar is provided with a first-type limiting part, and a second side of the each support bar is provided with a second-type limiting part, and shapes of the first-type limiting part and the second-type limiting part are complementary; and the first-type limiting part and the second-type limiting part of two adjacent support bars are complementary and coordinate.

Optionally, the plurality of support bars are provided with at least two rows of limiting parts, and each row of limiting parts are aligned in an arrangement direction of the support bars.

Optionally, limiting parts in adjacent rows are arranged alternately.

Optionally, each support bar includes two or more sections of bars, sections of bars of the plurality of support bars are arranged side by side, and each row of bars is provided with at least one row of limiting parts.

An embodiment of the present application further provides a support assembly, configured to be arranged on a non-display surface of a flexible display screen, and including a first support member and a second support member; where the first support member is a bendable plate-like structure; and the second support member is arranged on a side of the first support member away from the flexible display screen and includes a plurality of support bars arranged in a first direction, and the plurality of support bars have a same extending direction and are fixed on the first support member.

Optionally, the support assembly is configured to move around a roller shaft together with the flexible display screen to realize unfolding and folding of the flexible display screen; the first support member includes a rolling and sliding part and a plane part, and the rolling and sliding part is configured to move around the roller shaft; and the rolling and sliding part is provided with a hollow opening; or both the rolling and sliding part and the plane part are provided with hollow openings.

Optionally, the hollow opening includes at least two rows of through holes, each row of through holes is arranged in an extending direction of the roller shaft, the through holes in odd-numbered rows and the through holes in even-numbered rows are at least partly staggered; and the through holes are strip-shaped holes extending in the extending direction of the roller shaft.

Optionally, the second support member is in the rolling and sliding part.

Optionally, the support assembly further includes a reinforcement structure arranged on a side of the first support member away from the flexible display screen and arranged in the plane part.

Optionally, the reinforcement structure is made of a same material as the first support member or the second support member.

Optionally, a thickness of the reinforcement structure is substantially same as a thickness of the second support member in a direction perpendicular to the first support member.

Optionally, the first support member includes metal or alloy material, and a thickness of the first support member is 0.02 mm-0.5 mm.

Optionally, the second support member includes metal, alloy or metal oxide material, a width of each of the support bars in the second support member is 0.1 mm-1 mm, and a thickness of each of the support bars in a direction perpendicular to the first support member is 0.1 mm-1 mm.

Optionally, at least some of the plurality of support bars are provided with limiting parts, and positions between the support bars and adjacent support bars thereof are limited relative to the limiting parts.

Optionally, the limiting part includes at least one of a protrusion structure and a groove structure; the protrusion structure includes an arc protrusion, a square protrusion, a trapezoidal protrusion and a concave protrusion; and the groove structure includes an arc groove, a square groove and a trapezoidal groove.

Optionally, the plurality of support bars include a first support bar located at one end; among the plurality of support bars, one sides of remaining support bars other than the first support bar facing the first support bar each are provided with the limiting part, and the limiting part is the protrusion structure.

Optionally, the plurality of support bars include two end support bars at two ends and middle support bars between the two end support bars; two sides of each middle support bar facing the two end support bars are provided with the limiting part, one side of each end support bar facing the middle support bars is provided with the limiting part, and the limiting part is the protrusion structure.

Optionally, a first side of each support bar is provided with a first-type limiting part, and a second side of the each support bar is provided with a second-type limiting part, and shapes of the first-type limiting part and the second-type limiting part are complementary; and the first-type limiting part and the second-type limiting part of two adjacent support bars are complementary and coordinate.

Optionally, the plurality of support bars are provided with at least two rows of limiting parts, and each row of limiting parts are aligned in an arrangement direction of the support bars.

Optionally, limiting parts in adjacent rows are arranged alternately.

Optionally, each support bar includes two or more sections of bars, sections of bars of the plurality of support bars are arranged side by side, and each row of bars is provided with at least one row of limiting parts.

DETAILED DESCRIPTION OF THE EMBODIMENTS

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those ordinary skilled in the art without creative work pertain to the protection scope of the present application.

It should be understood that the terms used herein to describe the embodiments of the present invention are not intended to limit and/or define the scope of the present invention. For example, unless otherwise defined, the technical or scientific terms used in the invention shall have the general meanings understood by those ordinary skilled in the art. The "first", "second" and similar words used in the invention do not represent any order, number or importance, and are only used to distinguish different components. Unless otherwise indicated clearly in the context, the singular "a", "one", "the" or the like does not denote a limitation of number but rather the existence of at least one.

Figure 1:
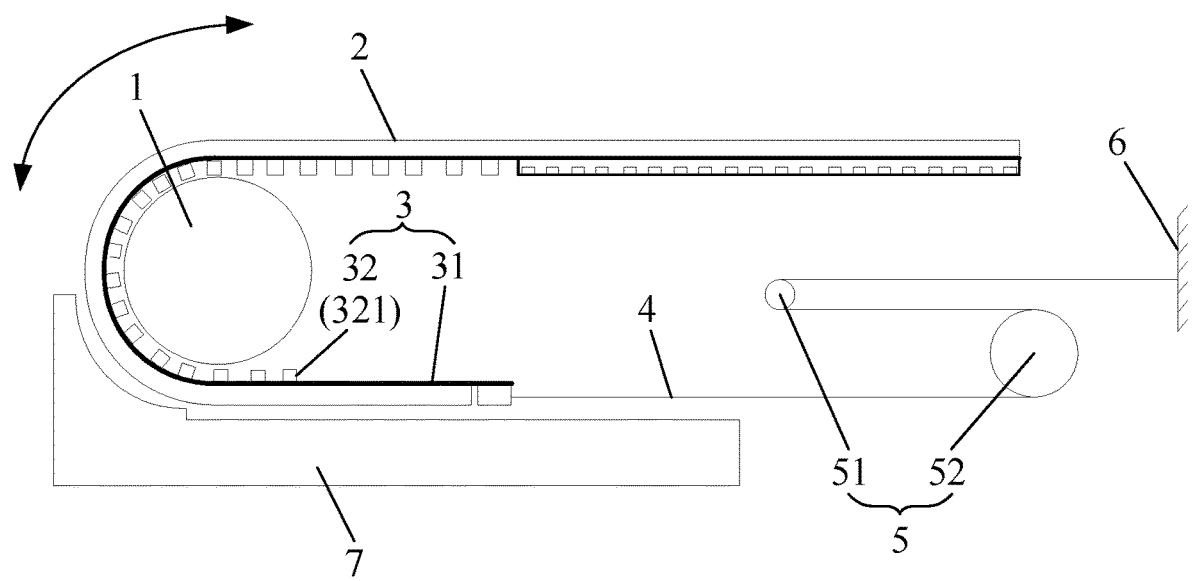
FIG. 1 is a schematic diagram of a partial cross-sectional structure of a flexible display apparatus provided by an embodiment of the present application.
Figure 2:
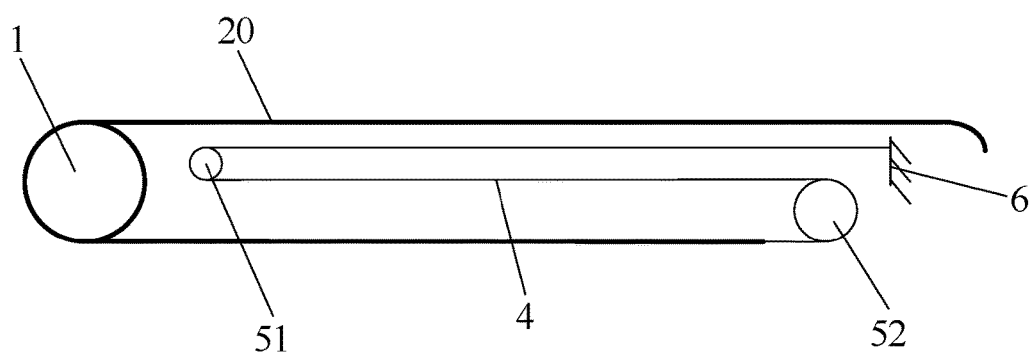
FIG. 2 is a schematic structural diagram of the flexible display apparatus in the folded state provided by an embodiment of the present application.
Figure 3:
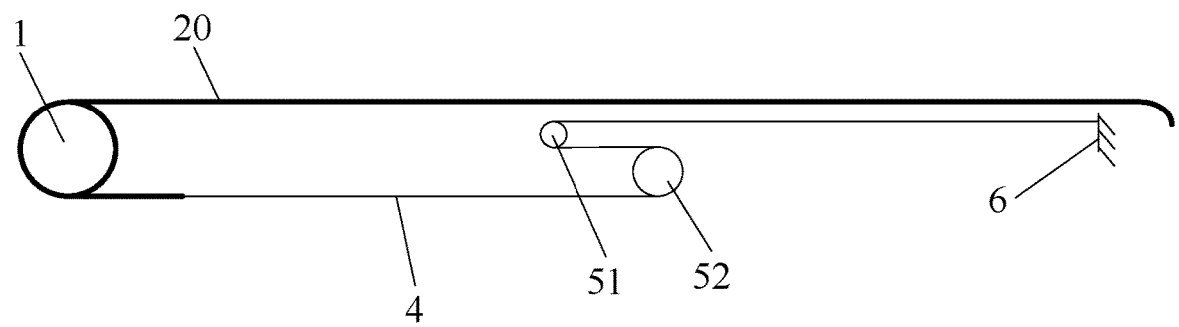
FIG. 3 is a schematic structural diagram of the flexible display apparatus in the unfolded state provided by an embodiment of the present application.

As shown in FIGS. 1, 2 and 3, an embodiment of the present application provides a flexible display apparatus, which includes:

a roller shaft 1; and
a flexible module 20 including a rolling and sliding area and a plane area, where the rolling and sliding area is configured to move around the roller shaft 1 to realize unfolding and folding of the flexible module 20.

The 'rolling and sliding area' is an area where the flexible module passes through the roller shaft during the curling and unfolding actions, and can also be called the curling part; and correspondingly, the 'plane area' is an area where the flexible module does not pass through the roller shaft during the curling and unfolding actions, and can also be called a non-curling part.

The flexible module 20 includes a flexible display screen 2 and a support assembly 3; the support assembly 3 is arranged on a surface of the flexible display screen 2 facing the roller shaft 1, and includes a first support member 31 and a second support member 32; the first support member 31 is a bendable plate-like structure, and the second support member 32 is arranged on a side of the first support member 31 away from the flexible display screen 2 and includes a plurality of support bars 321 arranged in a moving direction of the flexible module 20 (such as the direction indicated by the double-headed arrow in FIG. 1, that is, the direction in which the flexible module 20 moves back and forth around the roller shaft 1), and each support bar 321 has a same extending direction as the roller shaft 1 and is fixed on the first support member 31.

In the flexible display apparatus provided by the embodiment of the present application, the support assembly 3 is used to support the flexible display screen 2, and the support assembly 3 moves around the roller shaft 1 and can drive the flexible display screen 2 to realize unfolding and folding; and a continuous tension is applied to the support assembly 3 and the support assembly 3 is supported by the roller shaft 1, to keep the support assembly 3 in the tensioned flat state and thereby ensure the reliability of the unfolding and folding actions of the flexible module 20.

Specifically, in the support assembly 3, the first support member 31 is a plate-like structure and is close to the back of the flexible display screen 2, and has the main function of fixing the size and shape of the flexible display screen 2 and enhancing the support and dynamic curling reliability of the flexible module 20; and optionally, the second support member 32 may be a plurality of mutually independent support bars 321, which are not physically connected to each other. These support bars 321 are arranged close to the surface of the roller shaft 1, are parallel to each other and have the same extending direction as the roller shaft 1. During the process in which the flexible module 20 curls and moves around the roller shaft 1, the design of the independent support bars 321 can reduce the stress influence on the flexible module 20 as much as possible to improve the curling reliability of the flexible module 20, and can also reduce the overall resilience force of the flexible module 20, and reduce the difficulty of assembling the complete flexible display apparatus and the difficulty of realizing the curling action; and furthermore, while providing the support performance, the support bars 321 can also strengthen the friction between the flexible module 20 and the roller shaft 1, thereby improving the stability and reliability of the flexible module 20 moving and folding/unfolding around the roller shaft 1.

To sum up, through the two-layer support structure with the first support member 31 and the second support member 32, the flat state of the flexible display screen 2 can be maintained while enhancing the curling reliability of the flexible module 20, and the movement of the flexible module 20 around the roller shaft 1 is improved to realize the reliability of the unfolding and folding actions, thereby improving the assembly yield and service life of the flexible display apparatus.

In some embodiments, the flexible display screen 2 and the first support member 31 may be fixed by bonding, and the first support member 31 and the second support member 32 may also be fixed by bonding; or the first support member 31 may also be integrally formed with the second support member 32.

Figure 4:
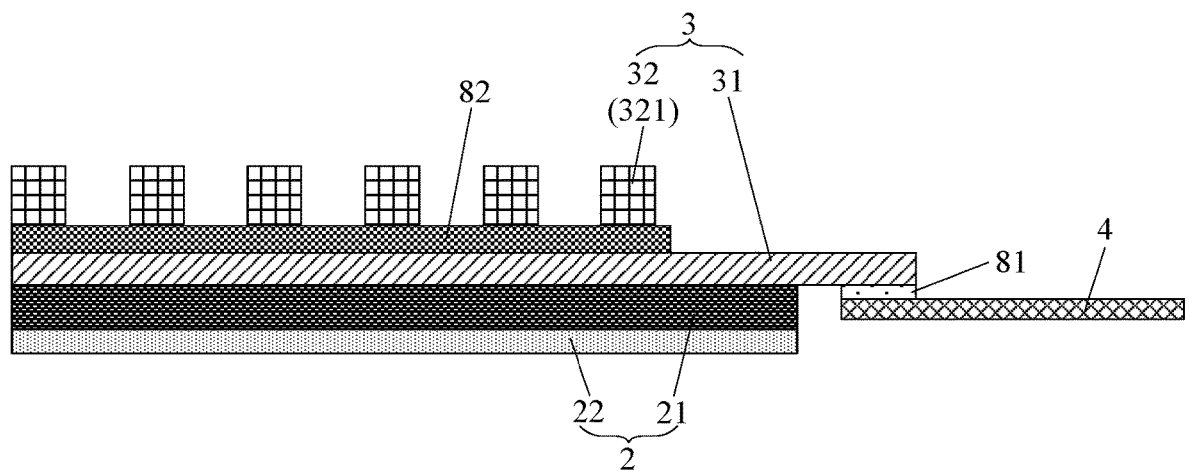
FIG. 4 is a schematic diagram of a cross-sectional structure of the flexible display apparatus at the connection part between the display module and the tension applying component provided by an embodiment of the present application.
Figure 5:
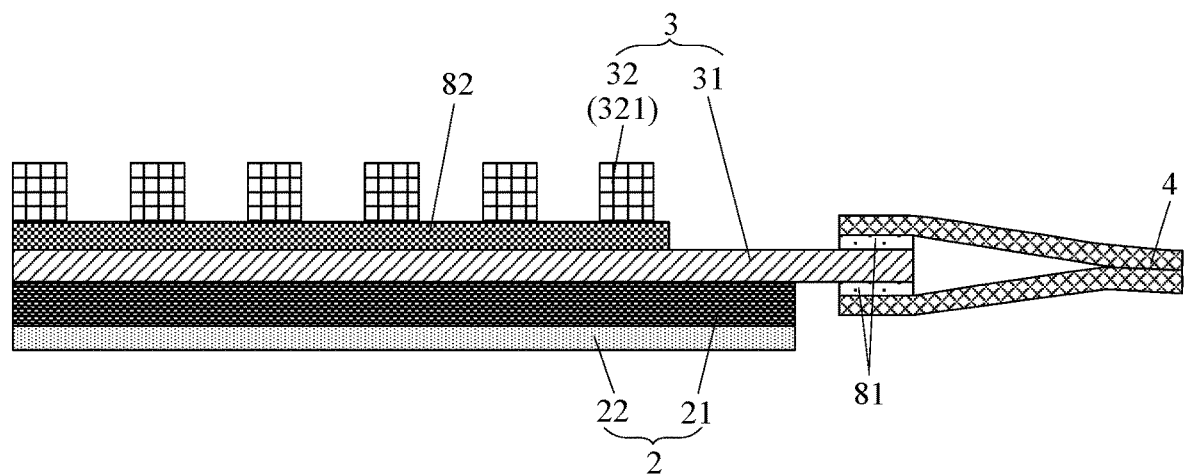
FIG. 5 is a schematic diagram of a cross-sectional structure of the flexible display apparatus at the connection part between the display module and the tension applying component provided by another embodiment of the present application.

Exemplarily, as shown in FIG. 4 and FIG. 5, the flexible display screen 2 may include a flexible display 21 and a cover plate 22, where the cover plate 22 is located on the side of the flexible display 21 away from the support assembly 3 and can support and protect the display surface of the flexible display 21.

In some embodiments, the flexible display apparatus provided by the embodiments of the present application may further include a tension applying component (such as a traction part 4, a steering shaft component 5 and a fixing part 6 in FIGS. 1 to 3). Referring to FIGS. 1 to 3, the support assembly 3 includes a first end and a second end oppositely arranged; the support assembly 3 bypasses the roller shaft 1 along the direction from the first end to the second end, and the first end of the support assembly 3 is connected to the tension applying component.

Specifically, the first end of the support assembly 3 is connected to the tension applying component, and the fixing and curling actions of the flexible module 20 can be realized through the tension applied by the tension applying component and the support of the roller shaft 1.

Exemplarily, as shown in FIGS. 1 to 3, the tension applying component includes a traction part 4, a steering shaft component 5 and a fixing part 6. The traction part 4 includes a third end and a fourth end, the third end is connected to the first support member 31 of the support assembly 3, and the fourth end bypasses the steering shaft component 5 and is connected to the fixing part 6; and the roller shaft 1 can move relative to the fixing part 6, to drive the flexible module 20 to move and unfold around the roller shaft 1.

Exemplarily, the traction part 4 may be a flexible strip or a flexible rope.

Exemplarily, the steering shaft component 5 may include a moving shaft 52 and a fixed shaft 51; the traction part 4 bypasses the fixed shaft 51 and the moving shaft 52 in turn so that the extending direction of the traction part 4 is reversed twice; where the position of the shaft center of the fixed shaft 51 is fixed relative to the fixing part 6, for example, the fixed shaft 51 and the fixing part 6 can be connected on the casing of the same part so that their relative positions are fixed; and the position of the shaft center of the moving shaft 52 is fixed relative to the shaft center of the roller shaft 1, for example, the central axis of the moving shaft 52 and the central axis of the roller shaft 1 can be connected through a connecting rod to ensure that the relative positions thereof remain unchanged. The moving shaft 52 and the roller shaft 1 can move synchronously to drive the flexible module 20 to move and unfold around the roller shaft 1.

Exemplarily, the fixed shaft 51 can be either a rollable shaft or a non-rollable cylindrical pin; and similarly, the moving shaft 52 can be either a rollable shaft or a non-rollable cylindrical pin. Optionally, the fixed shaft 51 is a cylindrical pin, and the moving shaft 52 is a rollable shaft.

Exemplarily, the roller shaft 1 is a rollable shaft, and the flexible module 20 and the roller shaft 1 are in damping contact and can drive each other. When the flexible module 20 moves around the roller shaft 1, the roller shaft 1 rolls synchronously.

Specifically, during the two reversals, the extending direction of the traction part 4 after each reversal is parallel to the extending direction before the reversal, so that the traction part 4 can generally extend in one dimensional direction, that is, extend between the roller shaft 1 and the fixing part 6. Then, on the one hand, the space volume occupied by the roller shaft 1, the traction part 4, the steering shaft component 5 and the fixing part 6 can be reduced to facilitate them to be accommodated in the module casing 7; and on the one hand, the synchronous movement of the moving shaft 52 and the roller shaft 1 away from the fixing part 6 and the rolling of the roller shaft 1 can drive the flexible module 20 to move around the roller shaft 1, which is beneficial for the flexible module 20 to realize the unfolding action.

Exemplarily, the traction part 4 can maintain a certain stretching tension, through which the flexible module 20, the moving shaft 52 and the roller shaft 1 can be pulled toward the fixing part 6, so that the flexible module 20 realizes folding.

Exemplarily, as shown in FIG. 1, the flexible display apparatus further includes a casing 7 in which the roller shaft 1 and the tension applying assembly are both located; the first end of the support assembly 3 is located in the casing 7 and is connected to the tension applying assembly, and the second end of the support assembly 3 bypasses the roller shaft 1 and protrudes out of the casing 7, that is, one end of the flexible module 20 is located in the casing 7, and the other end bypasses the roller shaft 1 and protrudes out of the casing 7.

Exemplarily, the casing 7 may include two parts that can move relative to each other, where the position of the first part is fixed relative to the roller shaft 1 and the moving shaft 52, and the position of the second part is fixed relative to the fixing part 6 and the fixed shaft 51; when the roller shaft 1 and the moving shaft 52 move relative to the fixing part 6, the first part and the second part of the casing 7 can move relative to each other.

Specifically, for example, the fixing part 6 can be a connecting part of the second part in the casing 7; one end of the flexible module 20 is connected to the fixing part 6 by the tension applying component, and the other end of the flexible module 20 bypasses the roller shaft 1 and protrudes out of the casing 7. Referring to FIG. 1 and FIG. 2, when the moving shaft 52 and the roller shaft 1 move away from the fixing part 6, the rolling of the roller shaft 1 can drive the flexible module 20 to protrude out of the casing 7 and unfold; and referring to FIG. 1 and FIG. 3, the flexible module 20 can move toward the fixing part 6 under the pulling of the traction part 4, so as to retract the flexible module 20 into the casing 7.

Of course, the curling movement of the flexible display apparatus provided by the embodiments of the present application is not limited to the driving mode described above, and can be adjusted according to actual requirements. For example, the relative positions of the fixing part 6 and the roller shaft 1 may be fixed, and the moving shaft 52 moves back and forth relative to the roller shaft 1, to drive the traction part 4 to drive the flexible module 20 to move.

In some embodiments, as shown in FIG. 4, FIG. 5, FIG. 6 and FIG. 7, the flexible display apparatus provided by the embodiments of the present application may further include a first adhesive layer 81 between the traction part 4 and the first support member 31, where the traction part 4 and the first support member 31 are bonded by the first adhesive layer 81.

Exemplarily, the edge of the first support member 31 close to the first end exceeds the edge of the flexible display screen 2 close to the first end, and the traction part 4 is connected to a part of the first support member 31 beyond the flexible display screen 2. In other words, the length of the first support member 31 is greater than the length of the flexible display screen 2, and the part of the first support member 31 beyond the flexible display screen 2 along the length direction is used to connect with the tension applying component, and the tension applying component applies a tension to the first support member 31 so that the entire flexible module 20 remains flat and achieves the curling action.

Exemplarily, as shown in FIG. 4, the traction part 4 is bonded to a side surface of the first support member 31 facing the flexible display screen 2. That is, the bonding part of the traction part 4 and the flexible display screen 2 are located on the same side of the first support member 31.

Alternatively, as shown in FIG. 5, the traction part 4 includes a double-layer structure, which is respectively bonded to two surfaces of the first support member 31. That is, the traction part 4 is adhesively connected to two surfaces of the first support member 31.

Of course, the edge of the first support member 31 close to the first end may also be substantially aligned with the edge of the flexible display screen 2 close to the first end; and at this time, the traction part 4 is bonded to a side surface of the first support member 31 away from the flexible display screen 2. Specifically, 'substantially aligned' means that the distance between two edges is very small and within a set range, for example, the distance between two edges is within the range of ±1 mm.

Figure 6:
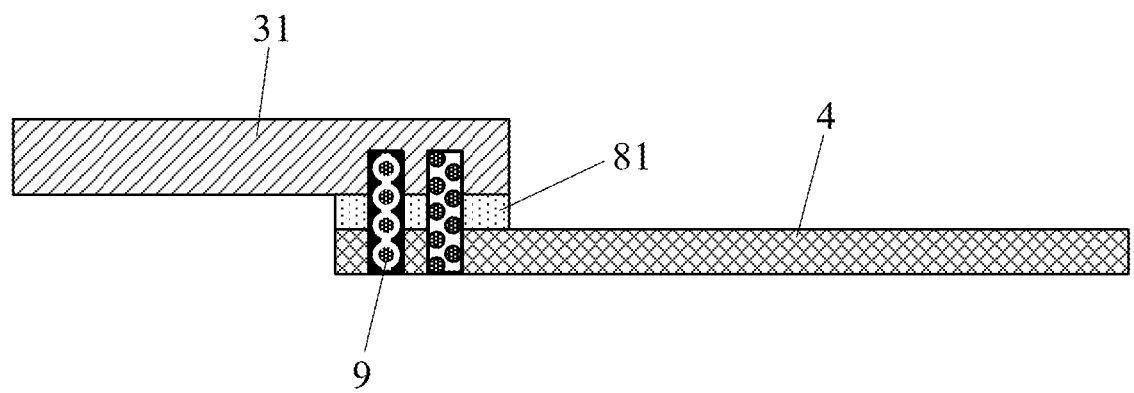
FIG. 6 is a schematic diagram of a cross-sectional structure of the flexible display apparatus at the connection between the first support member and the traction part provided by an embodiment of the present application.
Figure 7:
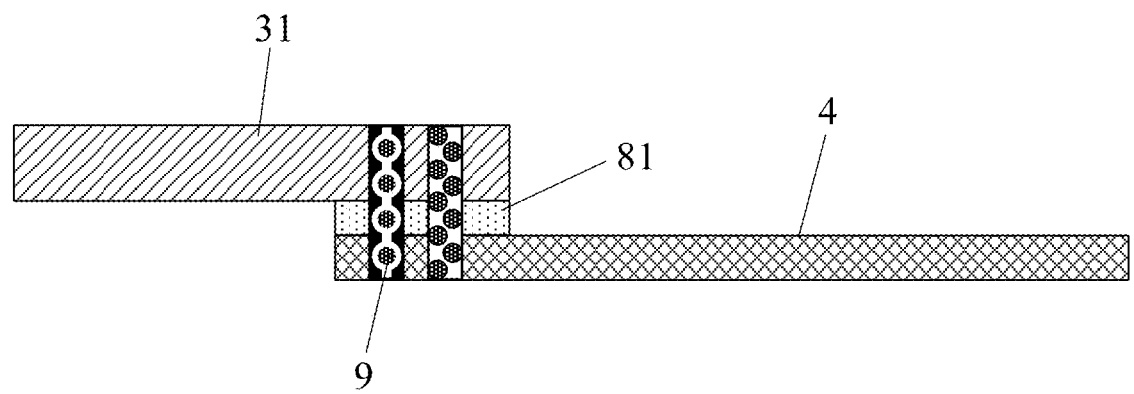
FIG. 7 is a schematic diagram of a cross-sectional structure of the flexible display apparatus at the connection between the first support member and the traction part provided by another embodiment of the present application.
Figure 8:
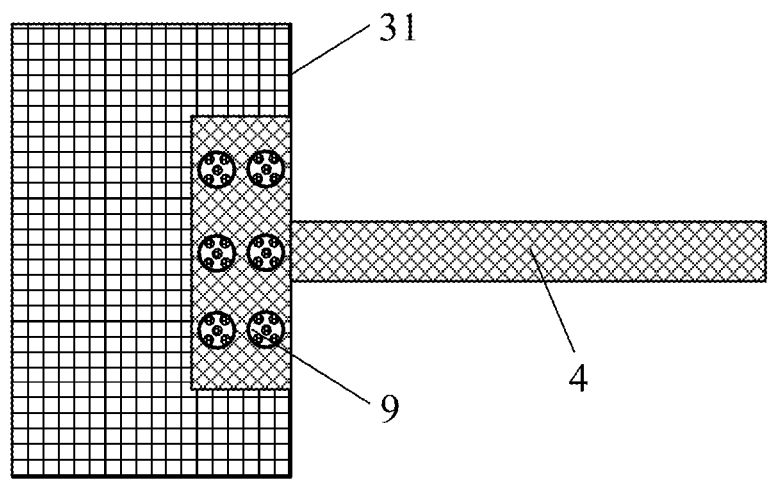
FIG. 8 is a schematic diagram of a top-view structure of the flexible display apparatus at the connection between the first support member and the traction part provided by an embodiment of the present application.

In some embodiments, as shown in FIG. 6, FIG. 7 and FIG. 8, the first support member 31 is provided with a first opening in the thickness direction of the first support member 31, the traction part 4 is provided with a second opening, and the first support member 31 is connected to the traction part 4 through one or more connectors 9 inserted into the first opening and the second opening, so that the bonding strength between the first support member 31 and the traction part 4 can be increased, thereby reducing the width of the bonding area.

Specifically, the connector may be made of polymer material. For example, the connector may include polymer materials with a certain viscosity, such as resin, rubber, plastic and paint, and may specifically be formed by coating, filling and then curing. In this way, the material of the connector can be placed in the first opening and the second opening by the hole-dispensing process, and the first support member and the traction part can be tightly connected after the material of the connector is cured. Specifically, the material of the connector may be silicone rubber, epoxy resin, acrylic resin, polyethylene resin, or the like.

Exemplarily, the first opening may be a half-through hole not penetrating the first support member 31 or a through hole penetrating the first support member 31; and the second opening may be a through hole penetrating the traction part 4.

In some embodiments, as shown in FIG. 4 and FIG. 5, the flexible module 20 further includes a second adhesive layer 82 located between the second support member 32 and the first support member 31, where the second support member 32 and the first The supports 31 are bonded by the second adhesive layer 82.

Exemplarily, the second adhesive layer may include a base material layer and adhesive layers on both sides of the base material layer, and the base material layer is made of polymer material. In other words, the second adhesive layer may adopt a double-sided adhesive structure.

Of course, the second adhesive layer is not limited to the double-sided adhesive tape, and may also adopt adhesive materials such as glue; and furthermore, the first adhesive layer may be made of the same material as the second adhesive layer, to facilitate the unified bonding process.

Figure 9:
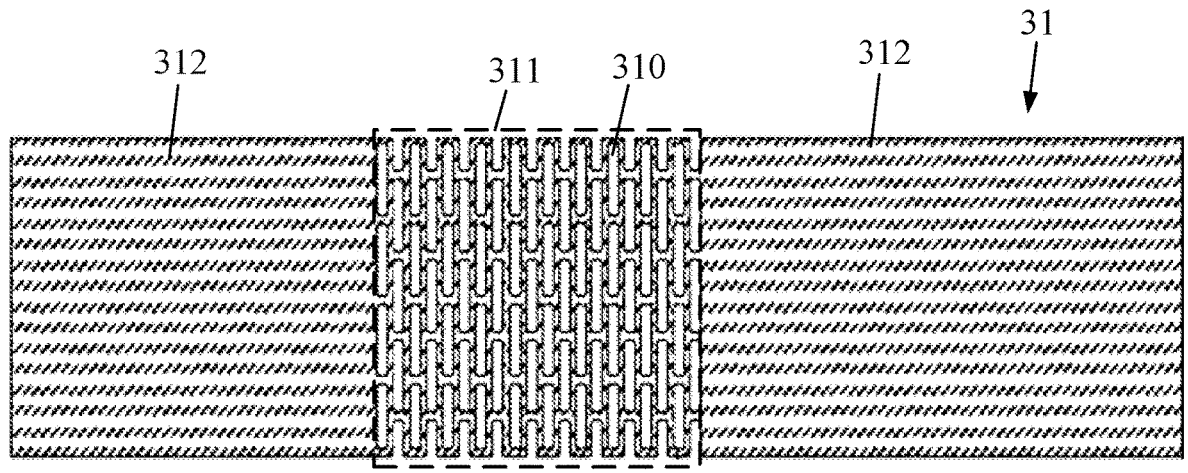
FIG. 9 is a schematic structural diagram of a first support member in the flexible display apparatus provided by an embodiment of the present application.
Figure 10:
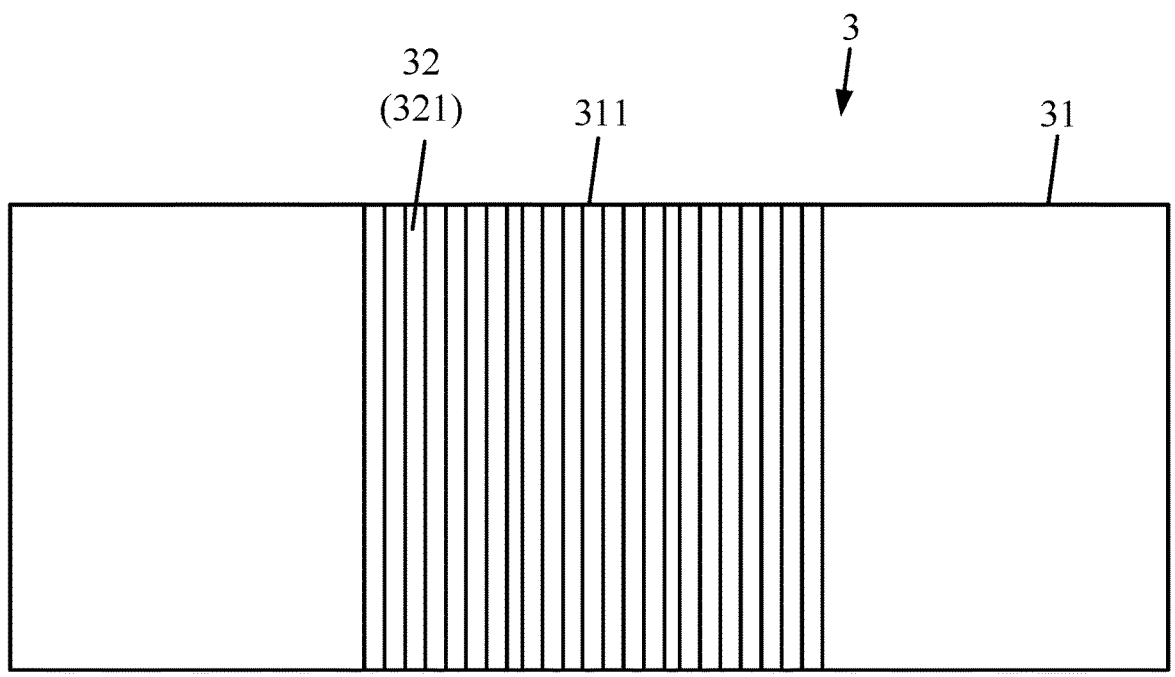
FIG. 10 is a schematic structural diagram of a support assembly provided by an embodiment of the present application.

In some embodiments, the first support member is provided with a hollow opening in the rolling and sliding area; as shown in FIG. 9 and FIG. 10, the first support member 31 may include a rolling and sliding part 311 located in the rolling and sliding area and a plane part located in the plane area 312, where the rolling and sliding part 311 is configured to move around the roller shaft; and the rolling and sliding part 311 is provided with a hollow opening.

The 'rolling and sliding part' is an area where the first support member passes through the roller shaft during the curling and unfolding actions, and can also be called the curling part; and correspondingly, the 'plane part' is an area where the first support member does not pass through the roller shaft during the curling and unfolding actions, and can also be called the non-curling part.

The rolling and sliding part of the first support member is provided with a hollow opening, thus improving the flexibility of this part and improving the curling reliability.

Alternatively, the first support member may also be provided with hollow openings in both the rolling and sliding area and the plane area, that is, both the rolling and sliding part 311 and the plane part 312 of the first support member may be patterned.

Exemplarily, as shown in FIG. 9, the hollow opening includes at least two rows of through holes 310, each row of through holes 310 is arranged in an extending direction of the roller shaft, the through holes 310 in odd-numbered rows and the through holes 310 in even-numbered rows are at least partly staggered; and the through holes are strip-shaped holes extending in the extending direction of the roller shaft.

In some embodiments, as shown in FIG. 10, the second support member 32 is located in the rolling and sliding area, that is, the second support member 32 is disposed on the rolling and sliding part 311 of the first support member 31. Alternatively, the second support member 32 is disposed on the part of the flexible module that curls and moves around the roller shaft.

Specifically, the second support member 32 includes at least three support bars 321.

Specifically, since the second support member 32 is an independent strip arranged side by side, the contact between the second support member 32 and the roller shaft can not only improve the support of the flexible display screen in the rolling and sliding area 311, but also enhance the friction between the flexible module and the roller shaft, to improve the stability and reliability of the flexible module moving and folding around the roller shaft.

Figure 11:
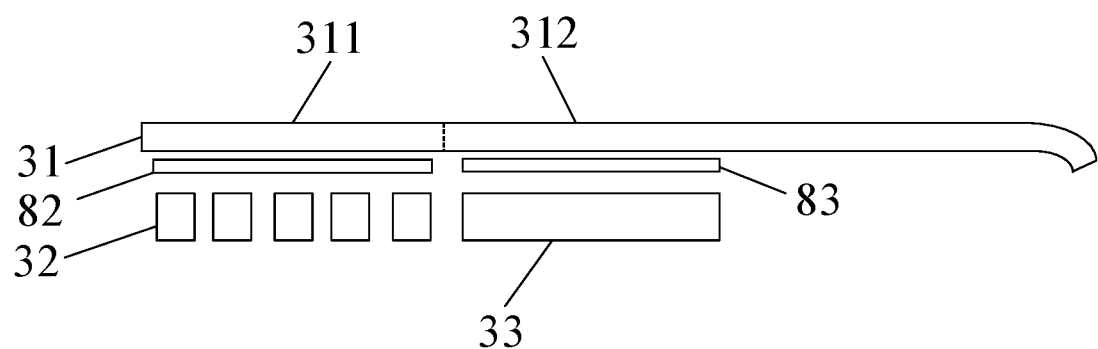
FIG. 11 is a schematic diagram of a cross-sectional structure of the support assembly provided by an embodiment of the present application.

In some embodiments, as shown in FIG. 11, the support assembly may further include a reinforcement structure 33 arranged on the side of the first support member 31 away from the flexible display screen and located in the plane area, that is, on the plane part 312 of the first support member 31.

Exemplarily, the reinforcement structure 33 is made of a same material as the first support member 31 or the second support member 32. For example, the reinforcement structure 33 may be made of stainless steel (SUS).

Exemplarily, the reinforcement structure 33 and the first support member 31 may be bonded and fixed by a third adhesive layer 83. The third adhesive layer 83 is made of the same material as the second adhesive layer 82.

In some embodiments, the thickness of the reinforcement structure 33 is roughly the same as the thickness of the second support member 32 in the direction perpendicular to the first support member 31, where "roughly the same" means that the thicknesses of them is the same or the thickness difference is less than 10%.

In some embodiments, the first support member includes metal or alloy material, which may be metal or alloy material with a high relative Young's modulus, such as stainless steel, structural steel, titanium alloy, etc., or may be metal with a low relative Young's modulus, such as copper and copper alloy, aluminum alloy, magnesium alloy, etc.

For example, the thickness of the first support member is 0.02 mm-0.5 mm, and for example, may specifically be 0.03 mm, 0.08 mm, 0.1 mm, 0.15 mm, 0.2 mm, 0.3 mm.

Alternatively, the first support member may also be a polymer film layer or an inorganic non-metallic layer that has a certain mechanical strength and can meet the requirements of flexibility and reliability, and for example, may be made of organic polymer material such as polyimide film or polyurethane foam, or inorganic non-metallic material such as glass or ceramics.

In some embodiments, the second support member includes metal, alloy or metal oxide material, and for example, may be specifically stainless steel, copper alloy, titanium alloy, etc., or a metal oxide such as ferrite, nickel oxide, etc. Exemplarily, the width of each support bar in the second support member is 0.1 mm-1 mm, and the thickness of each support bar in the direction perpendicular to the first support member is 0.1 mm-1 mm.

Specifically, when the support bar includes a structure such as limiting part or protrusion part, the 'width of each support bar' refers to the width of the main part of the support bar (other than the limiting part or protrusion part).

In some embodiments, as shown in FIG. 12 to FIG. 23, at least some of the plurality of support bars 321 in the second support member are provided with limiting parts 320, and relative positions between the at least some of the plurality of support bars 321 and adjacent support bars 321 thereof are limited by the limiting parts 320.

Exemplarily, the limiting part 320 is a part of the support bar 321 and can be integrated with the main body of the support bar in the production process.

Specifically, the support bars 321 in the present application are fine structures and arranged independently of each other. Then, in the actual arrangement process, it is difficult to ensure the position of each support bar 321 and the spacing between support bars. In an embodiment of the present application, the limiting parts 320 are arranged on the support bars 321, and the relative positions of adjacent support bars are defined by the limiting parts 320, so that the positions of adjacent support bars 321 can be easily determined and the spacing can be maintained. In the actual process, the difficulty of arranging and fixing the positions of independent support bars 321 can be reduced.

Exemplarily, the limiting part 320 may include at least one of a protrusion structure and a groove structure.

Figure 19:
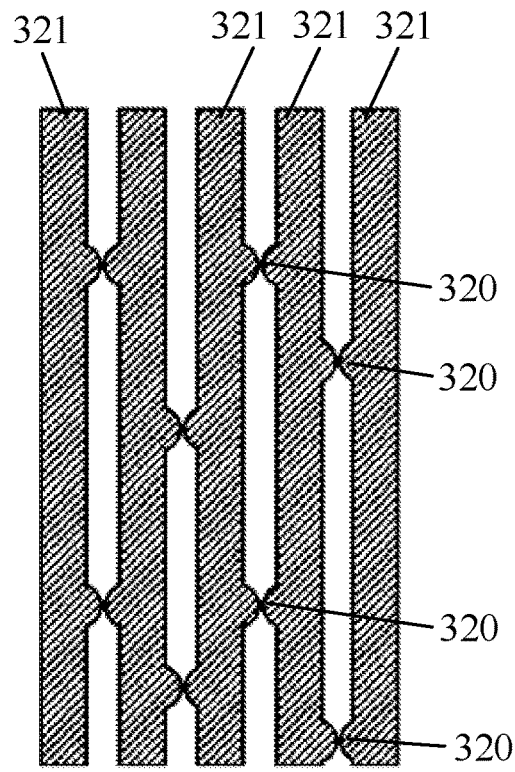
FIG. 19 is a partial structural schematic diagram of a second support member in the support assembly provided by another embodiment of the present application.
Figure 20:
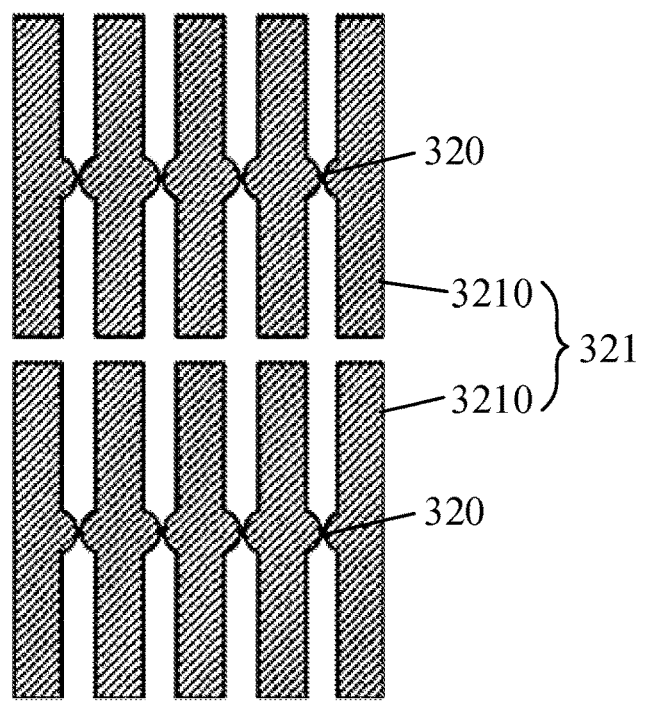
FIG. 20 is a partial structural schematic diagram of a second support member in the support assembly provided by another embodiment of the present application.
Figure 21:
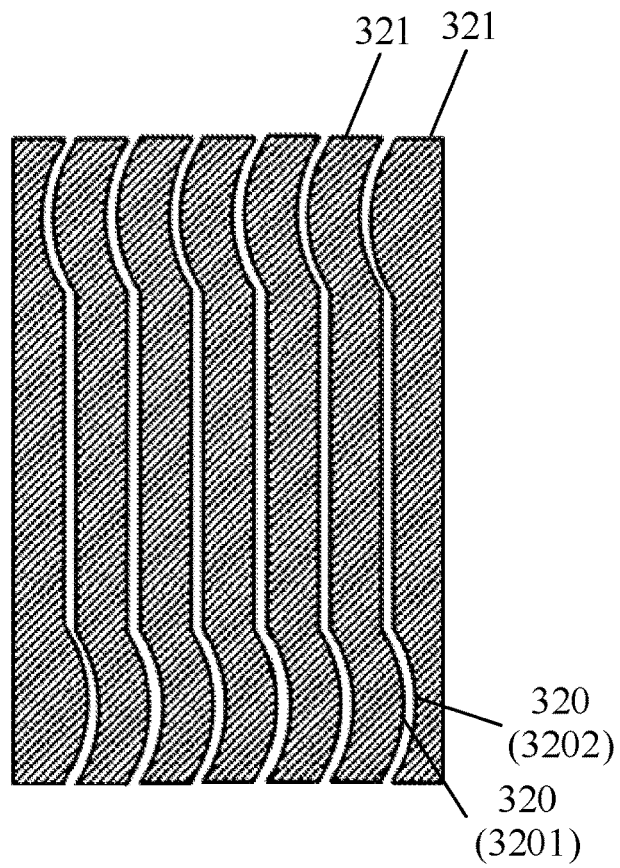
FIG. 21 is a partial structural schematic diagram of a second support member in the support assembly provided by another embodiment of the present application.
Figure 22:
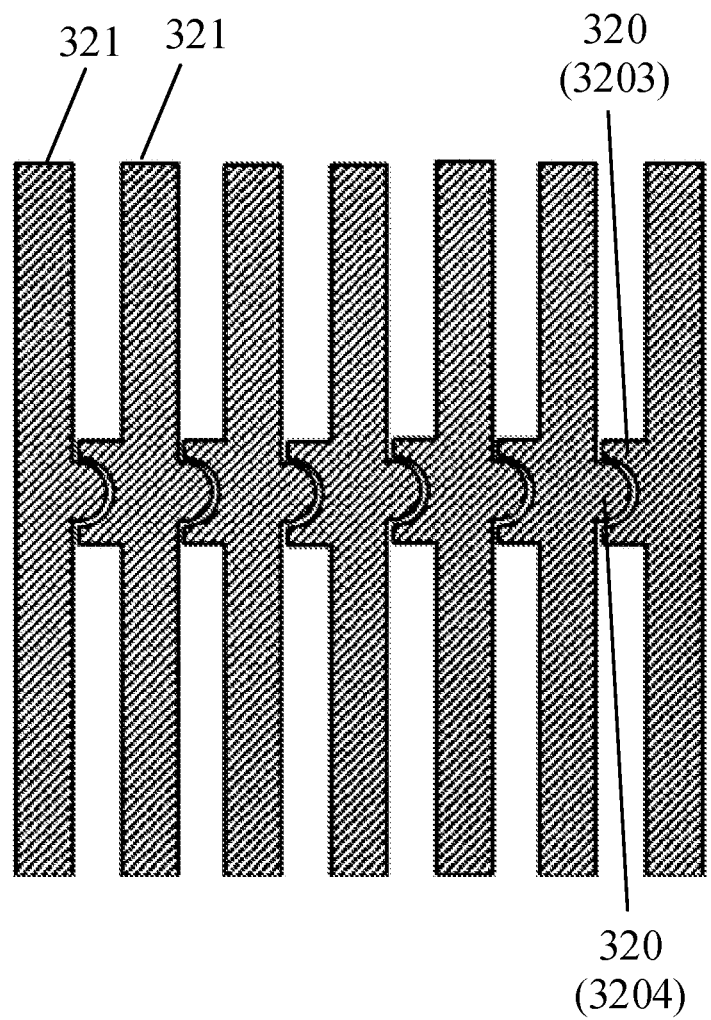
FIG. 22 is a partial structural schematic diagram of a second support member in the support assembly provided by another embodiment of the present application.
Figure 23:
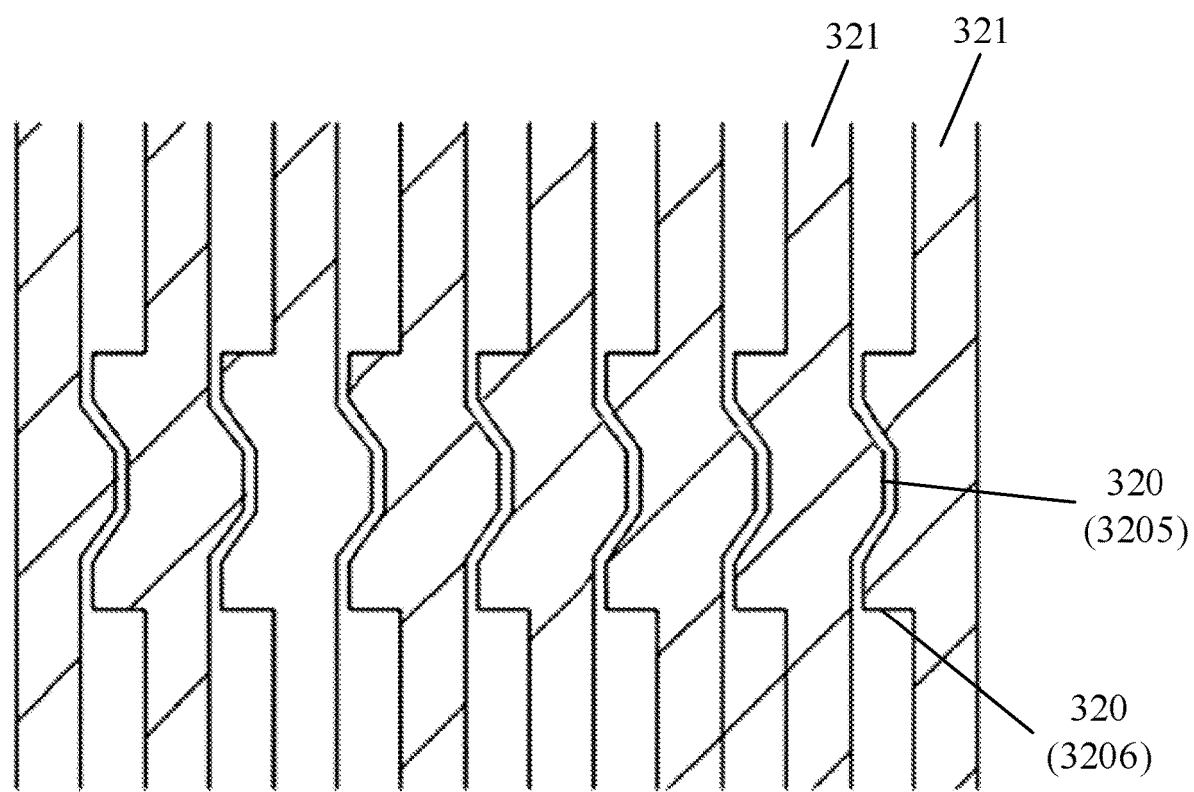
FIG. 23 is a partial structural schematic diagram of a second support member in the support assembly provided by another embodiment of the present application.

For example, the limiting part 320 in FIGS. 12 to 20 is a protrusion structure, and the limiting part 320 in FIGS. 21 to 23 includes both a protruding structure and a groove structure.

Figure 12:
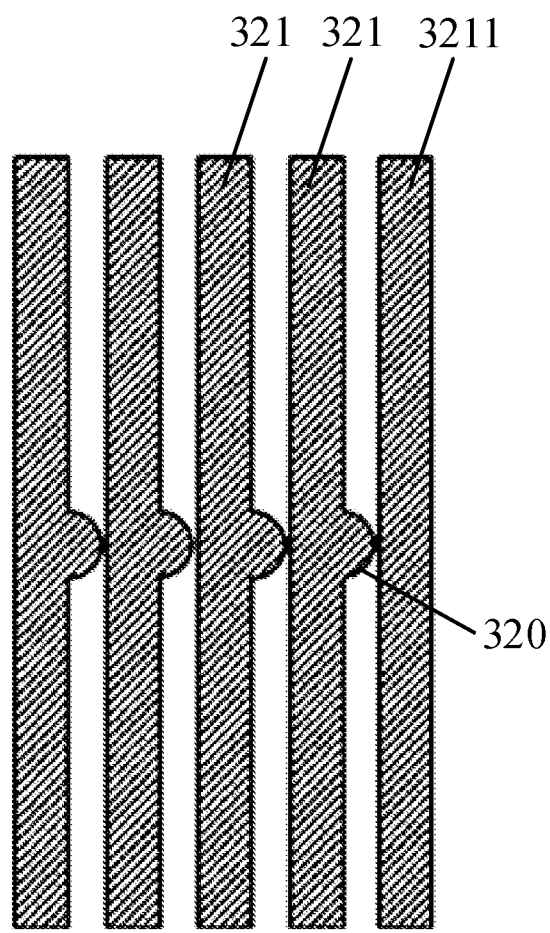
FIG. 12 is a partial structural schematic diagram of a second support member in the support assembly provided by an embodiment of the present application.
Figure 13:
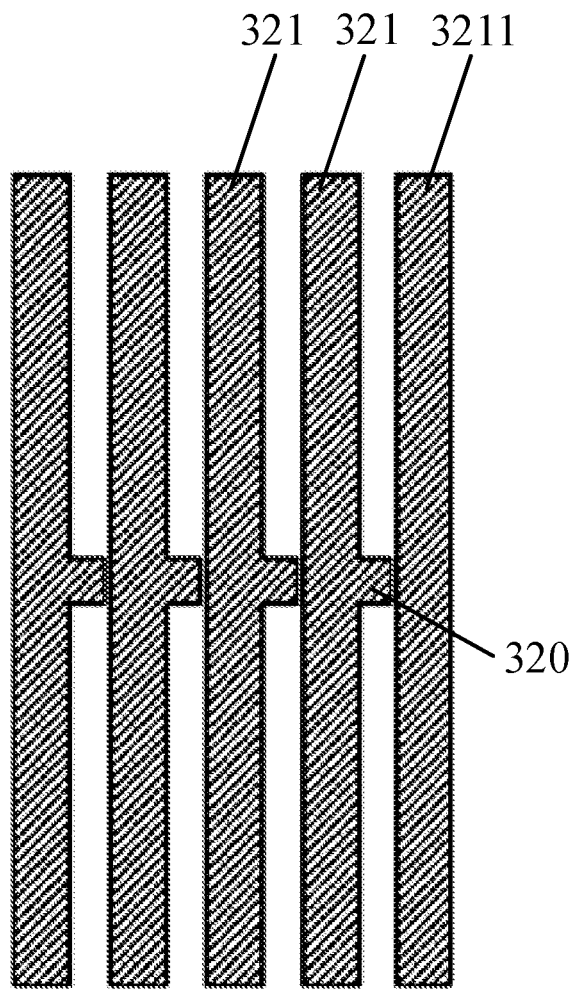
FIG. 13 is a partial structural schematic diagram of a second support member in the support assembly provided by another embodiment of the present application.
Figure 14:
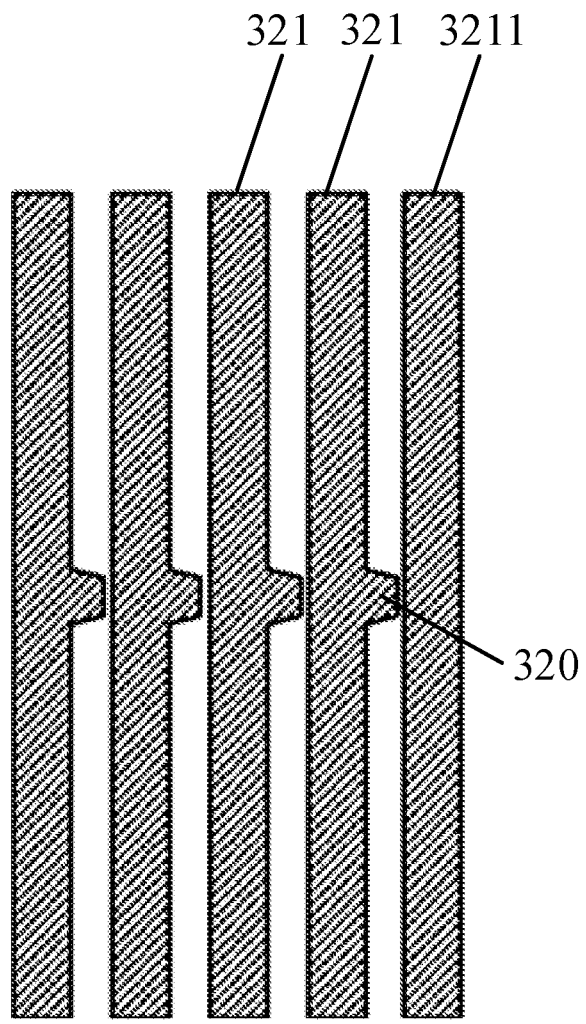
FIG. 14 is a partial structural schematic diagram of a second support member in the support assembly provided by another embodiment of the present application.

Exemplarily, the protrusion structure may include an arc protrusion, a square protrusion, a trapezoidal protrusion, a concave protrusion, etc.; for example, the limiting part 320 in FIGS. 12 and 15 to 20 is an arc protrusion, the limiting part 320 in FIG. 13 is a rectangular protrusion, and the limiting part 320 in FIG. 14 is a trapezoidal protrusion; the limiting part 320 in FIG. 22 includes a concave protrusion 3203; and the limiting part 230 in FIG. 23 includes a concave protrusion 3206.

Exemplarily, the groove structure includes an arc groove, a square groove and a trapezoidal groove. For example, the limiting part 320 in FIG. 21 includes an arc groove 3202.

In some embodiments, as shown in FIGS. 12 to 14, the plurality of support bars 321 include a first support bar 3211 located at one end; the limiting part 320 is provided on a side of each support bar 321 other than the first support bar 3211 among the plurality of support bars 321 facing the first support bar 3211, and the limiting part 320 is a protrusion structure.

Specifically, "one end" refers to one end along the arrangement direction of the support bars, so the first support bar refers to one end support bar; in other words, in the embodiments of the present application, a limiting part is provided on the side of each support bar 321 other than the support bar on one end facing the end, thus ensuring that the relative position between every two adjacent support bars can be limited by the limiting part.

Figure 15:
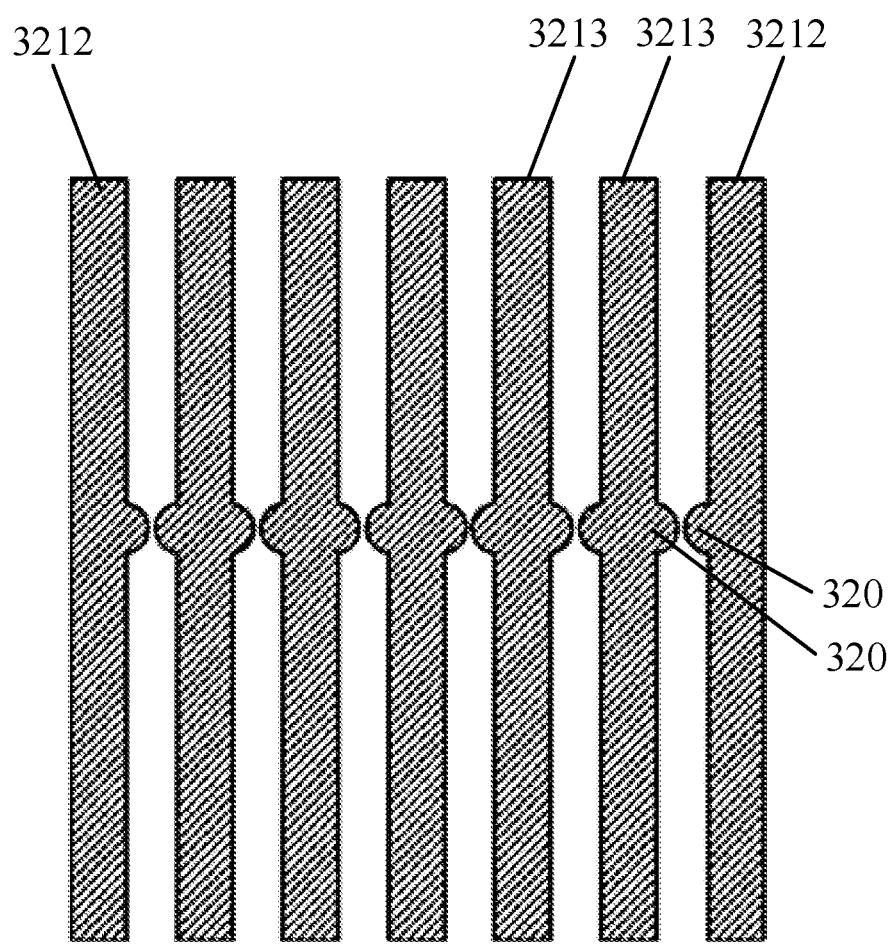
FIG. 15 is a partial structural schematic diagram of a second support member in the support assembly provided by another embodiment of the present application.
Figure 16:
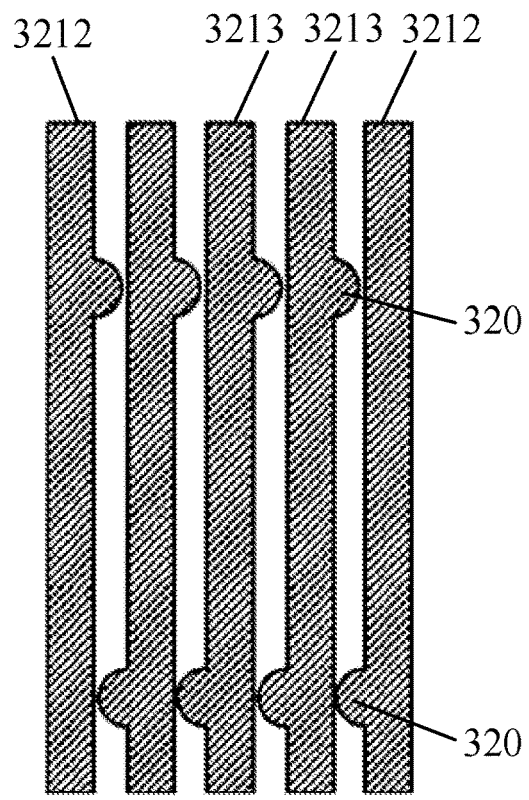
FIG. 16 is a partial structural schematic diagram of a second support member in the support assembly provided by another embodiment of the present application.

In other embodiments, as shown in FIG. 15 and FIG. 16, the plurality of support bars 321 include two end support bars 3212 located at two ends and middle support bars 3213 located between the two end support bars 3212. Specifically, 'two ends' refer to two ends along the arrangement direction of the support bars, so the two end support bars refer to the support bars located at both ends.

Exemplarily, two sides of each middle support bar 3213 facing the two end support bars 3212 are provided with a limiting part 320 respectively, and a side of each support bar 3212 facing the middle support bar 3213 is provided with a limiting part 320; and the limiting part 320 is a protrusion structure.

According to the above arrangement, two limiting parts 320 are arranged between every two adjacent support bars. Specifically, these two limiting parts 320 can limit the gap between two adjacent support bars, and the relative positional relationship of the two limiting parts 320 (for example, the two limiting parts 320 are aligned or staggered in the direction perpendicular to the support bars) is also beneficial to keep the two support bars aligned in the extending direction.

In some embodiments, a first side of each support bar is provided with a first-type limiting part, and a second side of the each support bar is provided with a second-type limiting part, and shapes of the first-type limiting part and the second-type limiting part are complementary; and the first-type limiting part and the second-type limiting part of two adjacent support bars are complementary and coordinate.

Specifically, through the complementary cooperation between the first-type limiting part and the second-type limiting part of two adjacent support bars, the two adjacent support bars can be mutually limited to thereby avoid the misalignment between the adjacent support bars, which is beneficial to reduce the arrangement difficulty of the support bars and simultaneously maintain the relative positional relationship between the support bars.

For example, in FIG. 21, two sides of each support bar 321 are respectively provided with a first-type limiting part and a second-type limiting part, which are respectively an arc protrusion 3201 and an arc groove 3202. The relative positional relationship between the support bars 321 can be maintained by the cooperation of the two complementary-shaped limiting parts 320 (i.e., the arc protrusion 3201 and the arc groove 3202). In FIG. 22, two sides of each support bar 321 are respectively provided with a first-type limiting part and a second-type limiting part, which are respectively an arc protrusion 3204 and a concave protrusion 3203, where the groove part of the concave protrusion 3203 is an arc groove. The relative positional relationship between the support bars 321 can be maintained by the cooperation of the two complementary-shaped limiting parts 320 (i.e., the arc protrusion 3204 and the concave protrusion 3203). In FIG. 23, two sides of each support bar 321 are respectively provided with a first-type limiting part and a second-type limiting part, which are respectively a trapezoidal protrusion 3205 and a concave protrusion 3206, where the groove part of the concave protrusion 3206 is a trapezoidal groove. The relative positional relationship between the support bars 321 can be maintained by the cooperation of the two complementary-shaped limiting parts 320 (i.e., the trapezoidal protrusion 3205 and the concave protrusion 3206).

Figure 17:
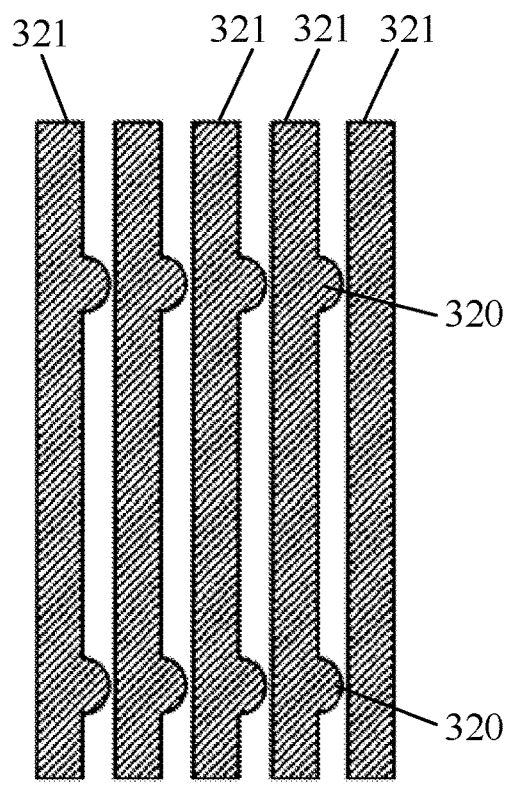
FIG. 17 is a partial structural schematic diagram of a second support member in the support assembly provided by another embodiment of the present application.
Figure 18:
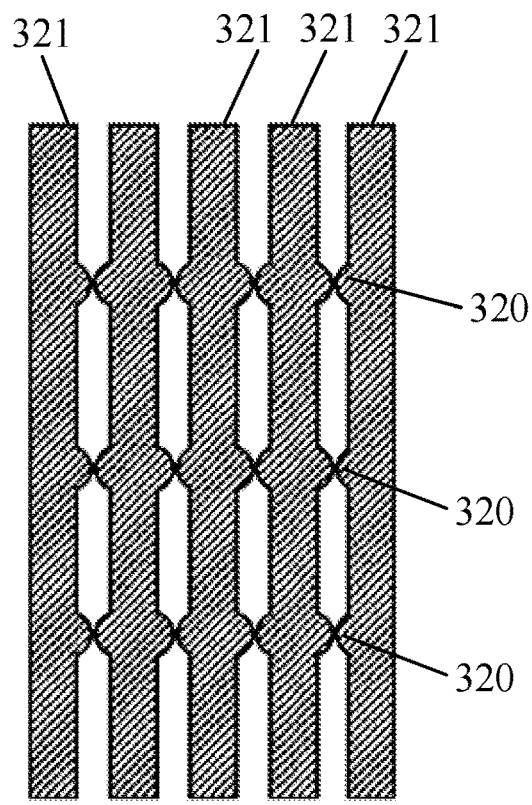
FIG. 18 is a partial structural schematic diagram of a second support member in the support assembly provided by another embodiment of the present application.

In some embodiments, as shown in FIG. 17 to FIG. 19, a plurality of support bars 321 are provided with at least two rows of limiting parts 320 arranged in the extending direction of the support bars 321, and each row of limiting parts 320 are aligned in the arrangement direction of the support bars 321. For example, the plurality of support bars 321 in FIG. 17 are provided with two rows of limiting parts 320; and the plurality of support bars 321 in FIG. 18 are provided with three rows of limiting parts 320.

Specifically, the design of this embodiment can improve the stability and consistency of the distances between the support bars 321 in the extending direction of the support bars 321 through the multiple rows of limiting parts 320.

In some embodiments, as shown in FIG. 19, the limiting parts 320 in adjacent rows are arranged alternately. In other words, the limiting parts 320 of the support bars 321 can be staggered to form two or more rows of limiting parts 320.

In some embodiments, as shown in FIG. 20, each support bar 321 may include two or more sections of bars 3210, all sections of bars 3210 of the plurality of support bars 321 are arranged side by side, and at least one row of limiting parts 320 are provided on each row of bars 3210. In other words, a row of support bars 321 is divided into two or more rows of bars 3210, and the limiting parts 320 are provided on each row of bars 3210, to maintain the gap and/or relative position between the bars 3210 in this row.

In the embodiment of the present application, due to the discontinuous design of the support bars 321, the breaking problem of the support bars 321 during bending or other flexible movements can be avoided or eliminated, and the reliability of the bending movement of the support assembly 3 itself can be improved. Moreover, since each row of bars 3210 is provided with at least one row of limiting parts 320, the gap and/or relative position between the rows of bars 3210 can be maintained.

Specifically, the flexible display apparatus provided by the above-mentioned embodiments of the present application can be applied to a flexible OLED, a flexible mini-LED, a flexible Micro-LED or a flexible QLED or other flexible display products, and can be specifically applied to a mobile phone, a tablet computer or a notebook or other products that can be used for curling display.

In another aspect, as shown in FIG. 9, an embodiment of the present application further provides a support assembly 3, configured to be arranged on a non-display surface of a flexible display screen, and including a first support member 31 and a second support member 32; where the first support member 31 is a bendable plate-like structure, the second support member 32 is arranged on a side of the first support member 31 away from the flexible display screen and includes a plurality of support bars 321 arranged in a first direction, and the support bars 321 have a same extending direction and are fixed on the first support member 31.

Specifically, in the support assembly 3 provided by the present application, the first support member 31 is a plate-like structure and is close to the back of the flexible display screen, and has the main function of fixing the size and shape of the flexible display screen and enhancing the support and dynamic curling reliability of the flexible module; and optionally, the second support member 32 may be a plurality of mutually independent support bars 321, which are not physically connected to each other. These support bars 321 are parallel to each other and extend in the same direction. During the curling process of the flexible display screen, the design of the independent support bars 321 can reduce the stress influence on the flexible module as much as possible to improve the curling reliability of the flexible module, and can also reduce the overall resilience force of the flexible module, and reduce the difficulty of assembling the complete flexible display apparatus and the difficulty of realizing the curling action; and furthermore, while providing the support performance, the support bars 321 can also strengthen the friction between the flexible display screen and other structure (such as the curling roller shaft) on the back side, thereby improving the reliability and dependability of the curling action of the flexible module.

To sum up, through the two-layer support structure with the first support member 31 and the second support member 32, the support assembly 3 provided by the present application can maintain the flat state of the flexible display screen, and at the same time, enhance the support and dynamic curling reliability of the flexible display screen, improve the reliability of the flexible curling action of the flexible display screen, and improve the assembly yield and service life of the curling display apparatus.

Exemplarily, in an embodiment of the present application, the first direction may be consistent with the extending direction of one edge of the flexible display screen; for example, the arrangement direction of the plurality of support bars 321 is consistent with the extending direction of one edge of the flexible display screen, and the extending direction of the support bars 321 is consistent with the extending direction of the other edge of the flexible display screen; the flexible display screen can be rolled or unfolded around an axis, and the extending direction of the support bars 321 is consistent with the extending direction of the axis.

In some embodiments, the first support member 31 is used to cover the back of the entire flexible display screen, that is, the first support member 31 and the flexible display screen can be approximately the same in shape and area; and on the side of the first support member 31 away from the flexible display screen, the second support member 32 may be evenly distributed on the entire first support member 31 or may be located only in a partial area of the first support member 31, which may specifically be determined according to actual product requirements.

Exemplarily, the support assembly provided by the embodiment of the present application is configured to move around a roller shaft together with the flexible display screen to realize unfolding and folding of the flexible display screen; and as shown in FIG. 9 and FIG. 10, in the support assembly provided by the embodiment of the present application, the first support member 31 may include a rolling and sliding part 311 and a plane part 312, where the rolling and sliding part 311 is configured to move around the roller shaft; and the rolling and sliding part 311 is provided with a hollow opening.

The 'rolling and sliding part' is an area where the first support member passes through the roller shaft when performing the curling and unfolding actions together with the flexible display screen, and can also be called a curling part; and correspondingly, the 'plane part' is an area where the first support member does not pass through the roller shaft during the curling and unfolding actions, and can also be called a non-curling part.

The rolling and sliding part 311 is provided with a hollow opening, thus improving the flexibility of this part and improving the curling reliability.

Alternatively, both the rolling and sliding part 311 and the plane part 312 are provided with hollow openings, that is, the entire surface of the first support member 21 can be patterned.

Exemplarily, as shown in FIG. 9, the hollow opening includes at least two rows of through holes 310, each row of through holes 310 is arranged in an extending direction of the roller shaft, the through holes 310 in odd-numbered rows and the through holes 310 in even-numbered rows are at least partly staggered; and the through holes are strip-shaped holes extending in the extending direction of the roller shaft.

Exemplarily, as shown in FIG. 10 and FIG. 11, the second support member 32 is arranged on the rolling and sliding part 311 of the first support member 31, that is, the second support member 32 is arranged on the part of the flexible module that curls and moves around the roller shaft.

Specifically, the second support member 32 includes at least three support bars 321.

Specifically, since the second support member 32 is an independent strip arranged side by side, the contact between the second support member 32 and the roller shaft can not only improve the support of the flexible display screen in the rolling and sliding area 311, but also enhance the friction between the flexible module and the roller shaft, to improve the stability and reliability of the flexible module moving and folding around the roller shaft.

In some embodiments, the flexible display screen and the first support member 31 may be fixed by bonding, and the first support member 31 and the second support member 32 may also be fixed by bonding.

In some embodiments, as shown in FIG. 11, the support assembly may further include a reinforcement structure 33 arranged on the side of the first support member 31 away from the flexible display screen and located on the plane part 312 of the first support member 31.

Exemplarily, the reinforcement structure 33 is made of a same material as the first support member 31 or the second support member 32. For example, the reinforcement structure 33 may be made of stainless steel (SUS).

Exemplarily, the first support member 31 and the second support member 32 are bonded and fixed by a second adhesive layer 82, and the reinforcement structure 33 and the first support member 31 may be bonded and fixed by a third adhesive layer 83. The third adhesive layer 83 can be made of the same material as the second adhesive layer 82.

In some embodiments, the thickness of the reinforcement structure 33 is roughly the same as the thickness of the second support member 32 in the direction perpendicular to the first support member 31, where "roughly the same" means that the thicknesses of them is the same or the thickness difference is less than 10%.

In some embodiments, the first support member includes metal or alloy material, which may be metal or alloy material with a high relative Young's modulus, such as stainless steel, structural steel, titanium alloy, etc., or may be metal with a low relative Young's modulus, such as copper and copper alloy, aluminum alloy, magnesium alloy, etc.

For example, the thickness of the first support member is 0.02 mm-0.5 mm, and for example, may specifically be 0.03 mm, 0.08 mm, 0.1 mm, 0.15 mm, 0.2 mm, 0.3 mm.

Alternatively, the first support member may also be a polymer film layer or an inorganic non-metallic layer that has a certain mechanical strength and can meet the requirements of flexibility and reliability, and for example, may be made of organic polymer material such as polyimide film or polyurethane foam, or inorganic non-metallic material such as glass or ceramics.

In some embodiments, the second support member includes metal, alloy or metal oxide material, and for example, may be specifically stainless steel, copper alloy, titanium alloy, etc., or a metal oxide such as ferrite, nickel oxide, etc.

Exemplarily, the width of each support bar in the second support member is 0.1 mm-1 mm, and the thickness of each support bar in the direction perpendicular to the first support member is 0.1 mm-1 mm.

Specifically, when the support bar includes a structure such as limiting part or protrusion part, the 'width of each support bar' refers to the width of the main part of the support bar (other than the limiting part or protrusion part).

In some embodiments, as shown in FIG. 12 to FIG. 23, at least some of the plurality of support bars 321 in the second support member are provided with limiting parts 320, and relative positions between the at least some support bars 321 and adjacent support bars 321 thereof are limited by the limiting parts 320.

Exemplarily, the limiting part 320 is a part of the support bar 321 and can be integrated with the main body of the support bar in the production process.

Specifically, the support bars 321 in the present application are fine structures and arranged independently of each other. Then, in the actual arrangement process, it is difficult to ensure the position of each support bar 321 and the spacing between support bars. In an embodiment of the present application, the limiting parts 320 are arranged on the support bars 321, and the relative positions of adjacent support bars are defined by the limiting parts 320, so that the positions of adjacent support bars 321 can be easily determined and the spacing can be maintained. In the actual process, the difficulty of arranging and fixing the positions of independent support bars 321 can be reduced.

Exemplarily, the limiting part 320 may include at least one of a protrusion structure and a groove structure.

For example, the limiting part 320 in FIGS. 12 to 20 is a protrusion structure, and the limiting part 320 in FIGS. 21 to 23 includes both a protruding structure and a groove structure.

Exemplarily, the protrusion structure may include an arc protrusion, a square protrusion, a trapezoidal protrusion, a concave protrusion, etc.; for example, the limiting part 320 in FIGS. 12 and 15 to 20 is an arc protrusion, the limiting part 320 in FIG. 13 is a rectangular protrusion, and the limiting part 320 in FIG. 14 is a trapezoidal protrusion; the limiting part 320 in FIG. 22 includes a concave protrusion 3203; and the limiting part 230 in FIG. 23 includes a concave protrusion 3206.

Exemplarily, the groove structure includes an arc groove, a square groove and a trapezoidal groove. For example, the limiting part 320 in FIG. 21 includes an arc groove 3202.

In some embodiments, as shown in FIGS. 12 to 14, the plurality of support bars 321 include a first support bar 3211 located at one end; the limiting part 320 is provided on a side of each support bar 321 other than the first support bar 3211 among the plurality of support bars 321 facing the first support bar 3211, and the limiting part 320 is a protrusion structure.

Specifically, "one end" refers to one end along the arrangement direction of the support bars, so the first support bar refers to one end support bar; in other words, a limiting part is provided on the side of each support bar 321 other than the support bar on one end facing the end, thus ensuring that the relative position between every two adjacent support bars can be limited by the limiting part.

In other embodiments, as shown in FIG. 15 and FIG. 16, the plurality of support bars 321 include two end support bars 3212 located at two ends and middle support bars 3213 located between the two end support bars 3212; the limiting parts 320 are provided on both sides of each middle support bar 3213 facing the two end support bars 3212, the limiting part 320 is provided on a side of each end support bar 3212 facing the middle support bars 3213, and the limiting part 320 is a protrusion structure.

Specifically, 'two ends' refer to two ends along the arrangement direction of the support bars, so the two end support bars refer to the support bars located at both ends.

The above arrangement makes it possible to have two limiting parts 320 between every two adjacent support bars. Specifically, these two limiting parts 320 can limit the gap between two adjacent support bars, and the relative positional relationship of the two limiting parts 320 (for example, the two limiting parts 320 are aligned or staggered in the direction perpendicular to the support bars) is also beneficial to keep the two support bars aligned in the extending direction.

In some embodiments, a first side of each support bar is provided with a first-type limiting part, and a second side of each support bar is provided with a second-type limiting part, so shapes of the first-type limiting part and the second-type limiting part are complementary; and the first-type limiting part and the second-type limiting part of two adjacent support bars are complementary and coordinate.

Specifically, through the complementary cooperation between the first-type limiting part and the second-type limiting part of two adjacent support bars, the two adjacent support bars can be mutually limited to thereby avoid the misalignment between the adjacent support bars, which is beneficial to reduce the arrangement difficulty of the support bars and simultaneously maintain the relative positional relationship between the support bars.

For example, in FIG. 21, two sides of each support bar 321 are respectively provided with a first-type limiting part and a second-type limiting part, which are respectively an arc protrusion 3201 and an arc groove 3202. The relative positional relationship between the support bars 321 can be maintained by the cooperation of the two complementary-shaped limiting parts 320 (i.e., the arc protrusion 3201 and the arc groove 3202). In FIG. 22, two sides of each support bar 321 are respectively provided with a first-type limiting part and a second-type limiting part, which are respectively an arc protrusion 3204 and a concave protrusion 3203, where the groove part of the concave protrusion 3203 is an arc groove. The relative positional relationship between the support bars 321 can be maintained by the cooperation of the two complementary-shaped limiting parts 320 (i.e., the arc protrusion 3204 and the concave protrusion 3203). In FIG. 23, two sides of each support bar 321 are respectively provided with a first-type limiting part and a second-type limiting part, which are respectively a trapezoidal protrusion 3205 and a concave protrusion 3206, where the groove part of the concave protrusion 3206 is a trapezoidal groove. The relative positional relationship between the support bars 321 can be maintained by the cooperation of the two complementary-shaped limiting parts 320 (i.e., the trapezoidal protrusion 3205 and the concave protrusion 3206).

In some embodiments, as shown in FIG. 17 to FIG. 19, a plurality of support bars 321 are provided with at least two rows of limiting parts 320 arranged in the extending direction of the support bars 321, and each row of limiting parts 320 are aligned in the arrangement direction of the support bars 321. For example, the plurality of support bars 321 in FIG. 17 are provided with two rows of limiting parts 320; and the plurality of support bars 321 in FIG. 18 are provided with three rows of limiting parts 320.

Specifically, the design of this embodiment can improve the stability and consistency of the distances between the support bars 321 in the extending direction of the support bars 321 through the multiple rows of limiting parts 320.

In some embodiments, as shown in FIG. 19, the limiting parts 320 in adjacent rows are arranged alternately. In other words, the limiting parts 320 of the support bars 321 can be staggered to form two or more rows of limiting parts 320.

In some embodiments, as shown in FIG. 20, each support bar 321 may include two or more sections of bars 3210, all sections of bars 3210 of the plurality of support bars 321 are arranged side by side, and at least one row of limiting parts 320 are provided on each row of bars 3210. In other words, a row of support bars 321 is divided into two or more rows of bars 3210, and the limiting parts 320 are provided on each row of bars 3210, to maintain the gap and/or relative position between the bars 3210 in this row.

In the embodiment of the present application, due to the discontinuous design of the support bars 321, the breaking problem of the support bars 321 during bending or other flexible movements can be avoided or eliminated, and the reliability of the bending movement of the support assembly 3 itself can be improved. Moreover, since each row of bars 3210 is provided with at least one row of limiting parts 320, the gap and/or relative position between the rows of bars 3210 can be maintained.

Specifically, the support assembly provided by the embodiments of the present application can be applied to a flexible display, such as flexible OLED, flexible mini-LED, flexible Micro-LED or flexible QLED; and for example, can be specifically applied to a mobile phone, a tablet computer or a notebook or other products that can be used for curling display.

It should be noted that, in some embodiments of the present disclosure, the flexible display apparatus may further include other structures, which may be determined according to actual requirements and are not limited in the embodiments of the present disclosure. In addition, various embodiments of the present disclosure are only examples of specific implementations, and the inventive solution of the present application is not limited to the above-mentioned embodiments. For example, various embodiments can be split or combined to form new embodiments, all of which belong to the protection scope of the technical solution of the present application. Furthermore, the drawings provided in the embodiments of the present application are only schematic diagrams, and the actual dimensions and proportions of the structures are not limited to the measured dimensions in the drawings.

Evidently those skilled in the art can make various modifications and variations to the embodiments of the present application without departing from the spirit and scope of the present application. The present application is also intended to encompass these modifications and variations therein as long as these modifications and variations to the present application come into the scope of the claims of the present application and their equivalents.

What is claimed is:

1. A flexible display apparatus, comprising:
    a roller shaft; and
    a flexible module comprising a rolling and sliding area and a plane area, wherein the rolling and sliding area is configured to move around the roller shaft to realize unfolding and folding of the flexible module; the flexible module comprises a flexible display screen and a support assembly; the support assembly is arranged on a surface of the flexible display screen facing the roller shaft, and comprises a first support member and a second support member; the first support member is a bendable plate-like structure, and the second support member is arranged on a side of the first support member away from the flexible display screen and comprises a plurality of support bars arranged in a moving direction of the flexible module, and each support bar has a same extending direction as the roller shaft and is fixed on the first support member;
    wherein at least some of the plurality of support bars are provided with limiting parts, and positions between the at least some of the plurality of support bars and adjacent support bars thereof are limited relative to the limiting parts.

2. The flexible display apparatus according to claim 1, further comprising a tension applying component;
    wherein the support assembly comprises a first end and a second end oppositely arranged; the support assembly bypasses the roller shaft along a direction from the first end to the second end, and the first end is connected to the tension applying component.

3. The flexible display apparatus according to claim 2, wherein the tension applying component comprises a traction part, a steering shaft component and a fixing part;
    the traction part comprises a third end and a fourth end, the third end is connected to the first support member, and the fourth end bypasses the steering shaft component and is connected to the fixing part; and
    the roller shaft moves relative to the fixing part, to drive the flexible module to move and unfold around the roller shaft.

4. The flexible display apparatus according to claim 3, wherein the steering shaft component comprises a moving shaft and a fixed shaft; and the traction part bypasses the fixed shaft and the moving shaft so that an extending direction reversed twice; and
    a position of a shaft center of the fixed shaft is fixed relative to the fixing part, and a position of a shaft center of the moving shaft is fixed relative to a shaft center of the roller shaft.

5. The flexible display apparatus according to claim 3, further comprising a first adhesive layer between the traction part and the first support member, wherein the traction part and the first support member are bonded by the first adhesive layer.

6. The flexible display apparatus according to claim 5, wherein an edge of the first support member close to the first end exceeds an edge of the flexible display screen close to the first end, and the traction part is connected to a part of the first support member beyond the flexible display screen;
    wherein the traction part is bonded to a surface of the first support member facing the flexible display screen;

wherein the traction part comprises a double-layer structure and the double-layer structure is respectively bonded to two surfaces of the first support member.

7. The flexible display apparatus according to claim 5, wherein an edge of the first support member close to the first end is substantially aligned with an edge of the flexible display screen close to the first end, and the traction part is bonded to a surface of the first support member away from the flexible display screen.

8. The flexible display apparatus according to claim 5, wherein the first support member is provided with a first opening in a thickness direction of the first support member, the traction part is provided with a second opening, the first support member is connected to the traction part through connectors inserted into the first opening and the second opening, and the connectors are made of polymer material;
   wherein the first opening is a half-through hole not penetrating the first support member or a through hole penetrating the first support member; and the second opening is a through hole penetrating the traction part.

9. The flexible display apparatus according to claim 2, further comprising a casing in which the roller shaft and the tension applying component are arranged;
   wherein the first end of the support assembly is in the casing, and the second end of the support assembly bypasses the roller shaft and protrudes out of the casing.

10. The flexible display apparatus according to claim 1, wherein the first support member is provided with a hollow opening in the rolling and sliding area; or
    the first support member is provided with hollow openings in both the rolling and sliding area and the plane area.

11. The flexible display apparatus according to claim 10, wherein the hollow opening comprises at least two rows of through holes, each row of through holes is arranged in an extending direction of the roller shaft, the through holes in odd-numbered rows and the through holes in even-numbered rows are at least partly staggered; and the through holes are strip-shaped holes extending in the extending direction of the roller shaft.

12. The flexible display apparatus according to claim 1, wherein the second support member is in the rolling and sliding area;
    wherein the support assembly further comprises a reinforcement structure arranged on a side of the first support member away from the flexible display screen and arranged in the plane area.

13. The flexible display apparatus according to claim 12, wherein the reinforcement structure is made of a same material as the first support member or the second support member;
    wherein a thickness of the reinforcement structure is substantially same as a thickness of the second support member in a direction perpendicular to the first support member.

14. The flexible display apparatus according to claim 1, further comprising a second adhesive layer between the second support member and the first support member, wherein the second support member and the first support member are bonded through the second adhesive layer; and
    the second adhesive layer comprises a base material layer and adhesive layers on both sides of the base material layer, and the base material layer is made of polymer material.

15. The flexible display apparatus according to claim 1, wherein the first support member comprises metal or alloy material, and a thickness of the first support member is 0.02 mm-0.5 mm.

16. The flexible display apparatus according to claim 1, wherein the second support member comprises metal, alloy or metal oxide material, a width of each of the support bars in the second support member is 0.1 mm-1 mm, and a thickness of each of the support bars in a direction perpendicular to the first support member is 0.1 mm-1 mm.

17. The flexible display apparatus according to claim 1, wherein the limiting part comprises at least one of a protrusion structure and a groove structure; the protrusion structure comprises an arc protrusion, a square protrusion, a trapezoidal protrusion and a concave protrusion; and the groove structure comprises an arc groove, a square groove and a trapezoidal groove;
    wherein the plurality of support bars comprise a first support bar located at one end; among the plurality of support bars, one sides of remaining support bars other than the first support bar facing the first support bar each are provided with the limiting part, and the limiting part is the protrusion structure;
    wherein the plurality of support bars comprise two end support bars at two ends and middle support bars between the two end support bars; two sides of each middle support bar facing the two end support bars are provided with the limiting part, one side of each end support bar facing the middle support bars is provided with the limiting part, and the limiting part is the protrusion structure;
    wherein a first side of each support bar is provided with a first-type limiting part, and a second side of the each support bar is provided with a second-type limiting part, and shapes of the first-type limiting part and the second-type limiting part are complementary; and the first-type limiting part and the second-type limiting part of two adjacent support bars are complementary and coordinate;
    wherein the plurality of support bars are provided with at least two rows of limiting parts, and each row of limiting parts are aligned in an arrangement direction of the support bars; wherein limiting parts in adjacent rows are arranged alternately; wherein each support bar comprises two or more sections of bars, sections of bars of the plurality of support bars are arranged side by side, and each row of bars is provided with at least one row of limiting parts.

18. A support assembly, arranged on a non-display surface of a flexible display screen, and comprising a first support member and a second support member; wherein the first support member is a bendable plate-like structure; and the second support member is arranged on a side of the first support member away from the flexible display screen and comprises a plurality of support bars arranged in a first direction, and the plurality of support bars have a same extending direction and are fixed on the first support member;
    wherein the support assembly is configured to move around a roller shaft together with the flexible display screen to realize unfolding and folding of the flexible display screen; the first support member comprises a rolling and sliding part and a plane part, and the rolling and sliding part is configured to move around the roller shaft; and the rolling and sliding part is provided with a hollow opening; or both the rolling and sliding part and the plane part are provided with hollow openings;

wherein the support assembly further comprises a reinforcement structure arranged on a side of the first support member away from the flexible display screen and arranged in the plane part;

wherein a thickness of the reinforcement structure is substantially same as a thickness of the second support member in a direction perpendicular to the first support member;

wherein the second support member comprises metal, alloy or metal oxide material, a width of each of the support bars in the second support member is 0.1 mm-1 mm, and a thickness of each of the support bars in a direction perpendicular to the first support member is 0.1 mm-1 mm.

19. The support assembly according to claim 18, wherein the hollow opening comprises at least two rows of through holes, each row of through holes is arranged in an extending direction of the roller shaft, the through holes in odd-numbered rows and the through holes in even-numbered rows are at least partly staggered; and the through holes are strip-shaped holes extending in the extending direction of the roller shaft; or wherein the second support member is in the rolling and sliding part.

20. A flexible display apparatus, comprising:

a roller shaft;

a flexible module comprising a rolling and sliding area and a plane area, wherein the rolling and sliding area is configured to move around the roller shaft to realize unfolding and folding of the flexible module; the flexible module comprises a flexible display screen and a support assembly; the support assembly is arranged on a surface of the flexible display screen facing the roller shaft, and comprises a first support member and a second support member; the first support member is a bendable plate-like structure, and the second support member is arranged on a side of the first support member away from the flexible display screen and comprises a plurality of support bars arranged in a moving direction of the flexible module, and each support bar has a same extending direction as the roller shaft and is fixed on the first support member; and a tension applying component;

wherein the support assembly comprises a first end and a second end oppositely arranged; the support assembly bypasses the roller shaft along a direction from the first end to the second end, and the first end is connected to the tension applying component;

the tension applying component comprises a traction part, a steering shaft component and a fixing part;

wherein the traction part comprises a third end and a fourth end, the third end is connected to the first support member, and the fourth end bypasses the steering shaft component and is connected to the fixing part; and the roller shaft moves relative to the fixing part, to drive the flexible module to move and unfold around the roller shaft;

the steering shaft component comprises a moving shaft and a fixed shaft; and the traction part bypasses the fixed shaft and the moving shaft so that an extending direction reversed twice; and a position of a shaft center of the fixed shaft is fixed relative to the fixing part, and a position of a shaft center of the moving shaft is fixed relative to a shaft center of the roller shaft.

* * * * *